(12) United States Patent
Appia

(10) Patent No.: US 9,769,461 B2
(45) Date of Patent: Sep. 19, 2017

(54) ADAPTIVE STRUCTURED LIGHT PATTERNS

(71) Applicant: Texas Instruments Incorporated, Dallas, TX (US)

(72) Inventor: Vikram VijayanBabu Appia, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 215 days.

(21) Appl. No.: 14/322,741

(22) Filed: Jul. 2, 2014

(65) Prior Publication Data

US 2015/0022644 A1    Jan. 22, 2015

Related U.S. Application Data

(60) Provisional application No. 61/846,862, filed on Jul. 16, 2013.

(51) Int. Cl.
*H04N 13/02* (2006.01)

(52) U.S. Cl.
CPC ..... *H04N 13/0271* (2013.01); *H04N 13/0253* (2013.01)

(58) Field of Classification Search
CPC ................ H04N 13/0271; H04N 13/0253
See application file for complete search history.

(56) References Cited

U.S. PATENT DOCUMENTS

2010/0332196 A1* 12/2010 Fisker ............... G06T 17/00 703/1
2012/0237112 A1* 9/2012 Veeraraghavan ..... G06T 7/0057 382/154

(Continued)

OTHER PUBLICATIONS

Xu et al., "An Adaptive Correspondence Algorithm for Modeling Scenes with Strong Interreflections," IEEE Transactions on Visualization and Computer Graphics, 2009, pp. 465-480.*

(Continued)

*Primary Examiner* — Thai Tran
*Assistant Examiner* — Christopher T Braniff
(74) *Attorney, Agent, or Firm* — Gregory J. Albin; Charles A. Brill; Frank D. Cimino

(57) ABSTRACT

A method of depth map optimization using an adaptive structured light pattern is provided that includes capturing, by a camera in a structured light imaging device, a first image of a scene into which a pre-determined structured light pattern is projected by a projector in the structured light imaging device, generating a first disparity map based on the captured first image and the structured light pattern, adapting the structured light pattern based on the first disparity map to generate an adaptive pattern, wherein at least one region of the structured light pattern is replaced by a different pattern, capturing, by the camera, a second image of the scene into which the adaptive pattern is projected by the projector, generating a second disparity map based on the captured second image and the adaptive pattern, and generating a depth image using the second disparity map.

20 Claims, 7 Drawing Sheets

(56) References Cited

OTHER PUBLICATIONS

Caspi et al., "Range Imaging With Adaptive Color Structured Light," IEEE Transactions on Pattern Analysis and Machine Intelligence, vol. 20, No. 5, May 1998, pp. 470-480.*

Li et al., "Optimized Two-Frequency Phase-Measuring-Profilometry Light-Sensor Temporal-Noise Sensitivity," J. Opt. Soc. Am. A, vol. 20, No. 1, Jan. 2003, pp. 106-115.*

Thomas P. Koninckx et al, "Scene-adapted Structured Light", IEEE Computer Society Conference on Computer Vision and Pattern Recognition, vol. 2, pp. 611-618, Jun. 20-25, 2005, San Diego, CA.

* cited by examiner

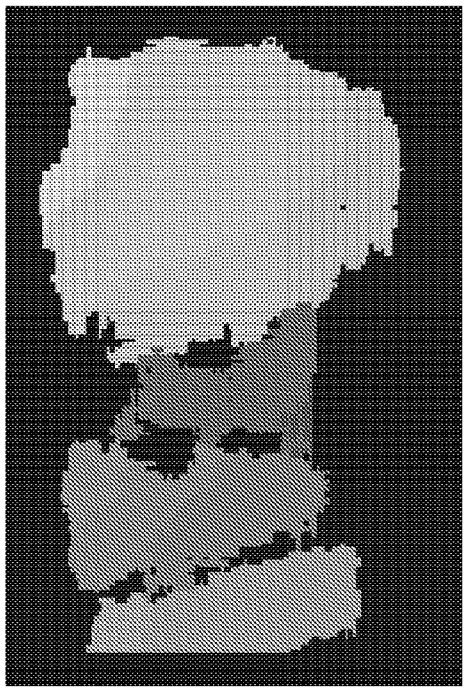
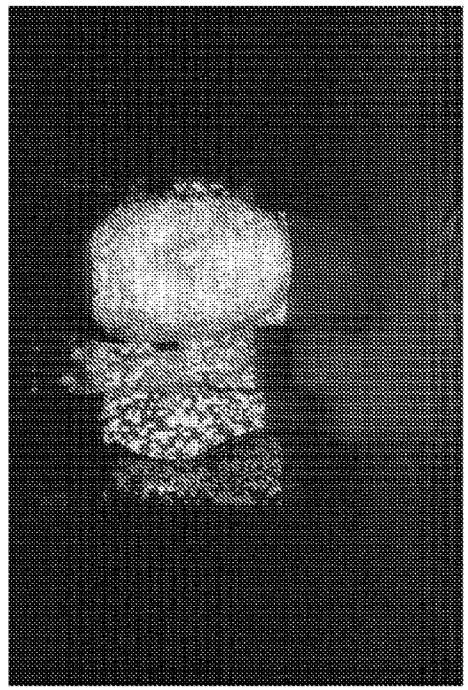
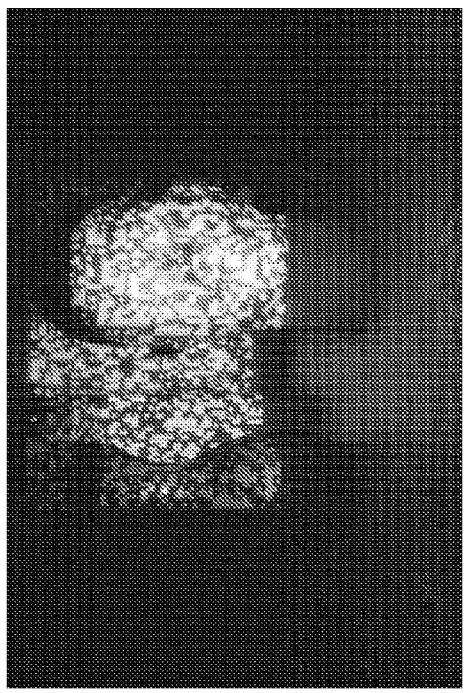
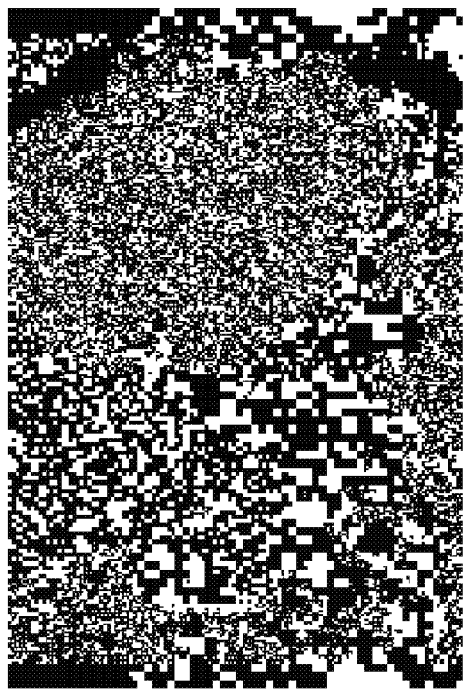
FIG. 7
FIG. 8

ADAPTIVE STRUCTURED LIGHT PATTERNS

CROSS-REFERENCE TO RELATED APPLICATIONS

This application claims benefit of U.S. Provisional Patent Application Ser. No. 61/846,862, filed Jul. 16, 2013, which is incorporated by reference herein in its entirety.

BACKGROUND OF THE INVENTION

Field of the Invention

Embodiments of the present invention generally relate to depth map optimization using adaptive structured light patterns in a structured light imaging device.

Description of the Related Art

In structured light imaging devices, a projector-camera pair is used to estimate the three-dimensional (3D) depth of a scene and shape of objects in the scene. The principle behind structured light imaging is to project patterns on objects/scenes of interest and capture images with the projected pattern. The depth is estimated based on variations of the pattern in the captured image in comparison to the projected pattern.

Structured light imaging devices can be broadly classified into two categories: single fixed pattern devices and time-multiplexed multi-pattern devices. Time-multiplexed pattern structured light imaging devices project several patterns with varying spatial frequencies, sweeping through the various patterns. The higher-frequency patterns can discern the finer details in the scene while lower spatial frequency patterns increase the range of depth values. Such a device generally requires that the scene be stationary during the entire capture process.

Fixed pattern structured light imaging devices project a single pattern on the scene and use a single captured image to estimate depth. Such devices are preferable when the objects in the scene are not stationary. These fixed pattern devices typically use a pattern with a single spatial frequency that is selected as a trade-off between capturing details in the scene and increasing the depth range, i.e., a higher spatial frequency pattern will capture details in the scene better whereas a lower frequency pattern will increase the depth range.

SUMMARY

Embodiments of the present invention relate to methods and apparatus for depth map optimization using adaptive structured light patterns. In one aspect, a method of image processing in a structured light imaging device is provided that includes capturing, by a camera in the structured light imaging device, a first image of a scene into which a pre-determined structured light pattern is projected by a projector in the structured light imaging device, generating a first disparity map based on the captured first image and the structured light pattern, adapting the structured light pattern based on the first disparity map to generate an adaptive pattern, wherein at least one region of the structured light pattern is replaced by a different pattern, capturing, by the camera, a second image of the scene into which the adaptive pattern is projected by the projector, generating a second disparity map based on the captured second image and the adaptive pattern, and generating a depth image using the second disparity map.

In one aspect, a structured light imaging device is provided that includes a projector component configured to project structured light patterns into a scene, an imaging sensor component configured to capture images of the scene including the structured light patterns, and a memory storing software instructions that, when executed by at least one processor comprised in the structured light imaging device, cause a method of imaging processing to be performed. The method includes capturing, by the camera, a first image of a scene into which a pre-determined structured light pattern is projected by the projector, generating a first disparity map based on the captured first image and the structured light pattern, adapting the structured light pattern based on the first disparity map to generate an adaptive pattern, wherein at least one region of the structured light pattern is replaced by a different pattern, capturing, by the camera, a second image of the scene into which the adaptive pattern is projected by the projector, generating a second disparity map based on the captured second image and the adaptive pattern, and generating a depth image using the second disparity map.

BRIEF DESCRIPTION OF THE DRAWINGS

Particular embodiments in accordance with the invention will now be described, by way of example only, and with reference to the accompanying drawings:

FIGS. 7-9 are examples.

DETAILED DESCRIPTION OF EMBODIMENTS OF THE INVENTION

Figure 1:
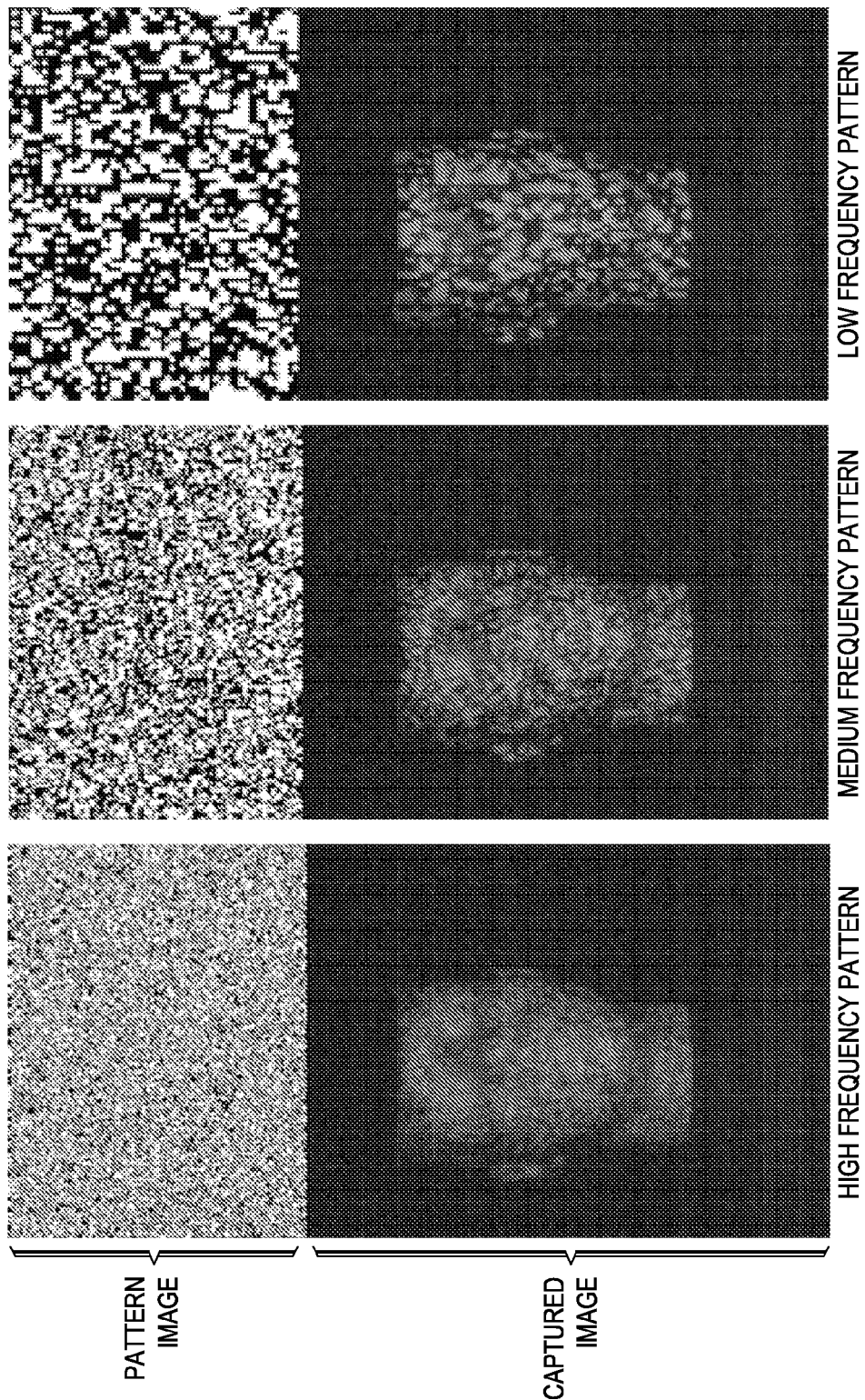
FIGS. 1-4 are examples.

Specific embodiments of the invention will now be described in detail with reference to the accompanying figures. Like elements in the various figures are denoted by like reference numerals for consistency.

As previously mentioned, there are different benefits for different types of structured light patterns. Using a single approach may not produce optimal results as some regions of a scene may be farther away than others and/or some objects in the scene may have finer details than others. Further, the colors of objects in the scene also affect the pattern captured in an image.

Figure 2:
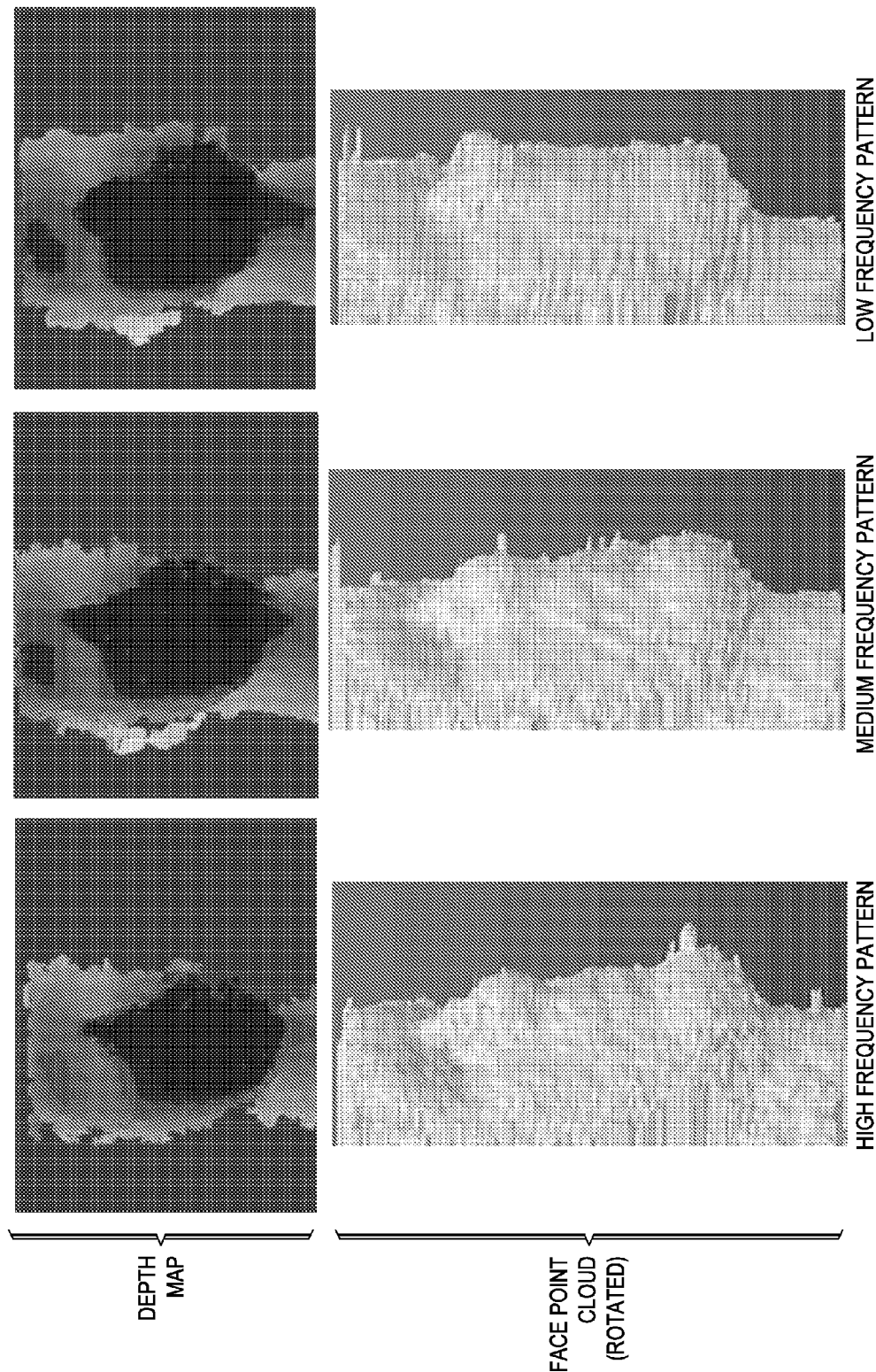

FIGS. 1-4 are examples illustrating the advantages of different patterns on a given scene. FIG. 1 illustrates high, medium, and low frequency structured light patterns and images of the same scene captured with each pattern. In the scene, the object is close to the camera. FIG. 2 shows the corresponding depth images and three-dimensional (3D) point clouds. As these example 3D point clouds illustrate, the pattern with high spatial frequency can capture the finer details of the scene better than the lower frequency patterns.

Figure 3:
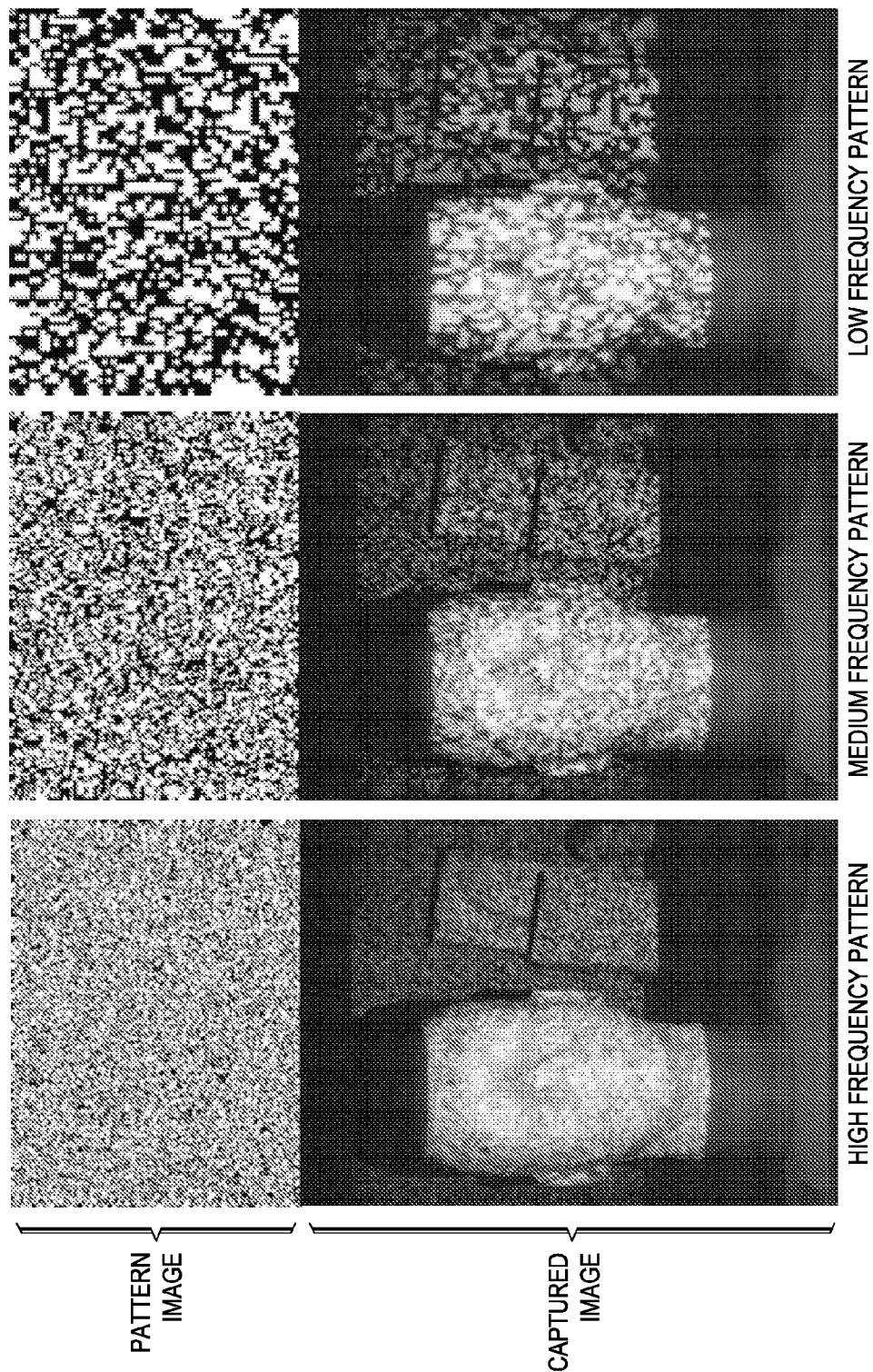
Figure 4:
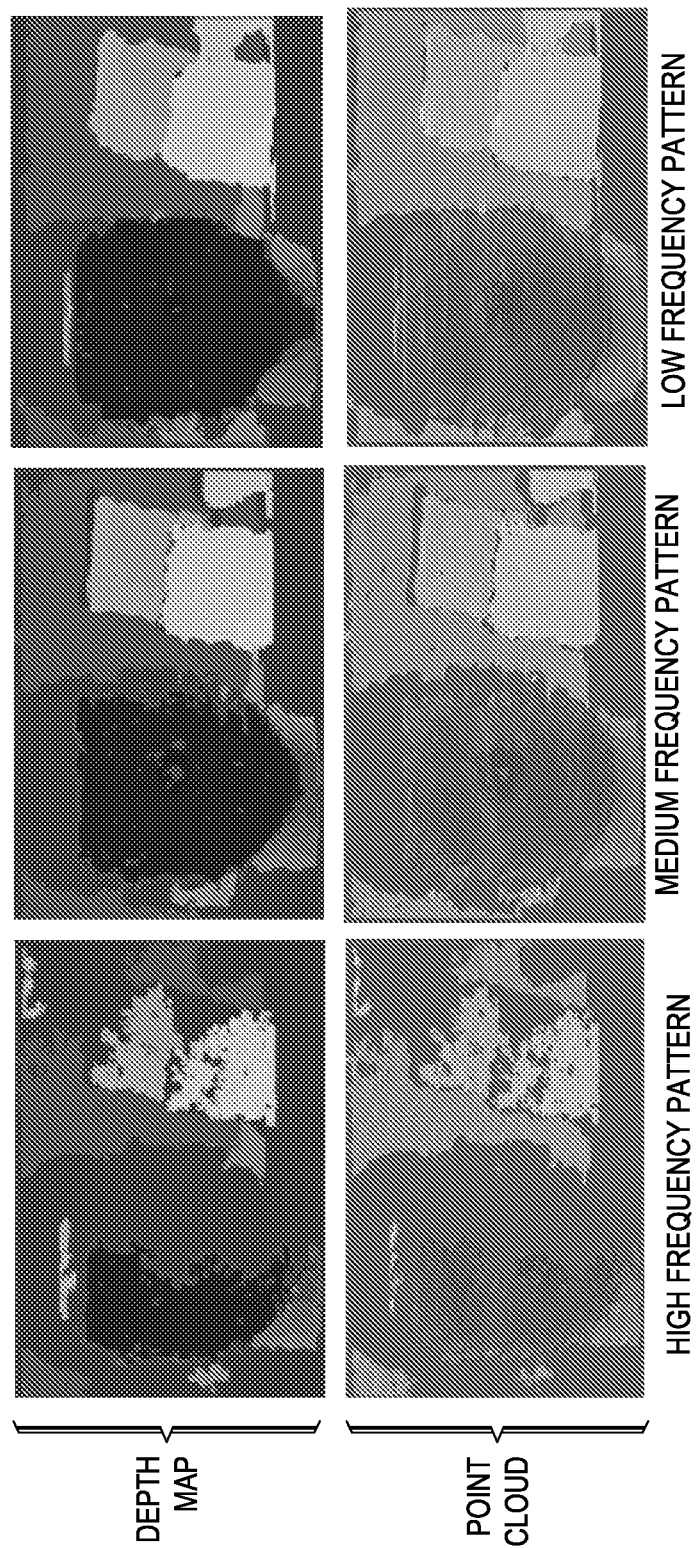

The examples of FIGS. 3 and 4 illustrate the need for low-frequency patterns. FIG. 3 illustrates high, medium, and low frequency structured light patterns and images of the same scene captured with each pattern. In this scene, rather than having one object close to the camera, there are objects placed at different depths. FIG. 4 shows the corresponding depth images and 3D point clouds. The objects that are farther away have a lower signal-to-noise (SNR) ratio in the captured images. Thus, the depth reconstruction can suffer when high-frequency patterns are used, but lower frequency patterns are less susceptible to SNR. Thus, to better reconstruct such a scene, patterns with multiple spatial frequencies are needed.

Embodiments of the invention provide for dynamic adaptation of a structured light pattern for the current scene by analyzing the scene content and changing the pattern as needed in one or more regions to better capture the depth of corresponding regions in the scene. Such an 'adaptive' pattern may include, for example, regions with low spatial frequency patterns and regions with high spatial frequency patterns based on the SNR of the returning light. In another example, an adaptive pattern may also include regions with a static pattern and regions with a time-multiplexed pattern depending on the objects in the scene that are in motion. In another example, the color of the adaptive pattern may be changed in one or more regions of the scene based on the colors of objects in the scene.

As is explained in more detail herein, such 'on-the-fly' adaptations of the pattern can be implemented by analyzing the content of the scene. Based on scene characteristics such as object details, color, received SNR, and/or motion in the captured images, a projected pattern may be adapted to project a suitable pattern as needed for optimal depth map computation for different locations in the scene. Such adaptive modifications to a pattern may involve learning the correspondence between real-world 3D points, locations in the camera image, and locations on the projection pattern.

Figure 5:
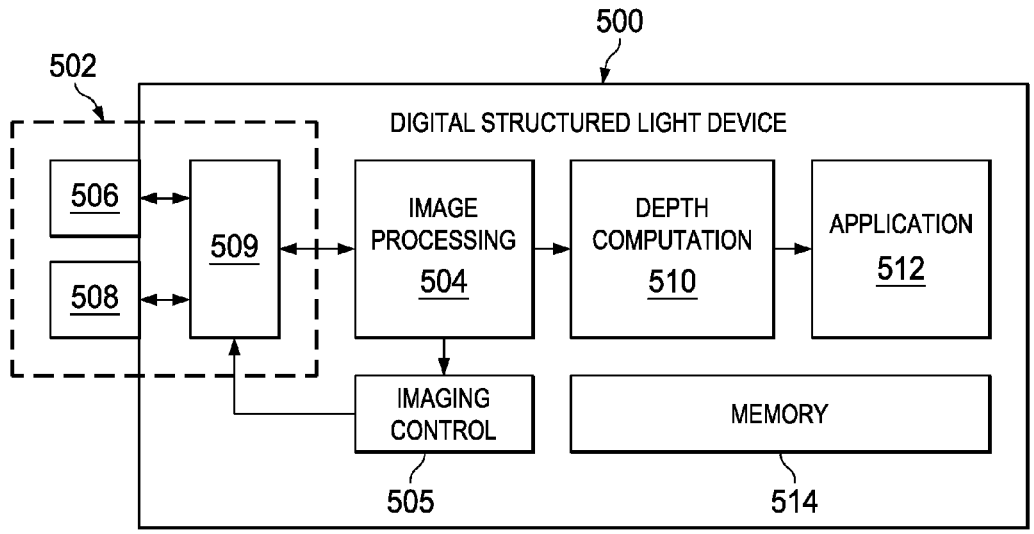
FIG. 5 is a block diagram of an example digital structured light device.

FIG. 5 is a block diagram of an example digital structured light device 500 configured to use an adaptive structured light pattern. More specifically, the digital structured light device 500 is configured to perform an embodiment of the method of FIG. 6 to adapt a structured light pattern to a scene and use the adapted pattern to generate depth images optimized for the scene.

The digital structured light device 500 includes a structured light imaging sub-system 502, an image processing component 504, an imaging control component 505, a memory component 514, a depth computation component 510, and an application component 512. The components of the digital structured light device 500 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Further, software instructions may be stored in memory in the memory component 514 and executed by one or more processors (not specifically shown).

The structured light imaging sub-system 502 includes an imaging sensor component 506, a projector component 508, and a controller component 509. The imaging sensor component 506 is an imaging sensor system arranged to capture image signals of a scene and the projector component 508 is a projection system arranged to project a pattern of light into the scene, e.g., the adaptive light pattern. The imaging sensor component 506 includes a lens assembly, a lens actuator, an aperture, and an imaging sensor. The projector component 508 includes a projection lens assembly, a lens actuator, an aperture, a light source, and projection circuitry. The structured light imaging sub-system 502 also includes circuitry for controlling various aspects of the operation of the sub-system, such as, for example, aperture opening amount, exposure time, synchronization of the imaging sensor component 506 and the projector component 508, etc. The controller component 509 includes functionality to convey control information from the imaging control component 505 to the imaging sensor component 506 and the projector component 508, to convert analog image signals from the imaging sensor component 506 to digital image signals, and to provide the digital image signals to the image component 504.

In some embodiments, the imaging sensor component 506 and the projection component 508 may be arranged vertically such that one component is on top of the other, i.e., the two components have a vertical separation baseline. In some embodiments, the imaging sensor component 506 and the projection component 508 may be arranged horizontally such that one component is next to the other, i.e., the two components have a horizontal separation baseline.

The image processing component 504 divides the incoming digital signal(s) into frames of pixels and processes each frame to enhance the image data in the frame. The processing performed may include one or more image enhancement techniques such as, for example, one or more of black clamping, fault pixel correction, color filter array (CFA) interpolation, gamma correction, white balancing, color space conversion, edge enhancement, denoising, contrast enhancement, detection of the quality of the lens focus for auto focusing, and detection of average scene brightness for auto exposure adjustment.

Figure 6:
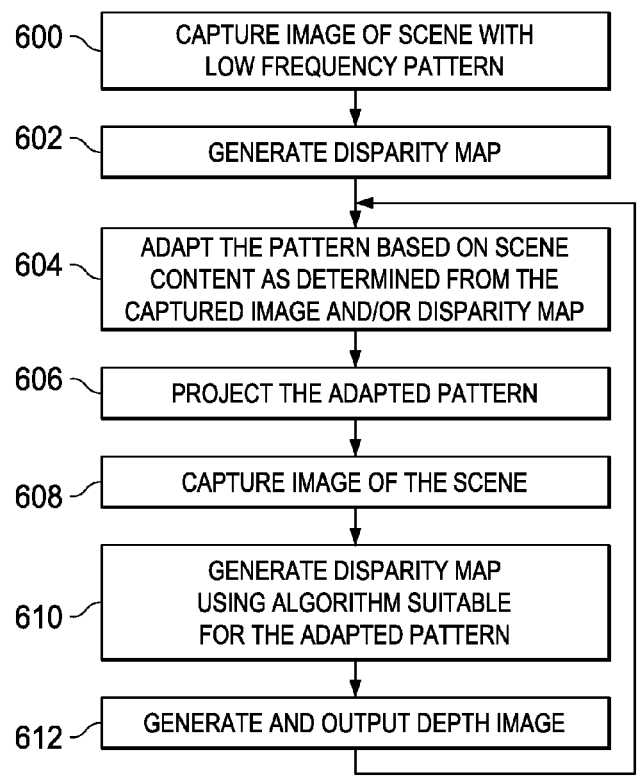
FIG. 6 is a flow diagram of a method.

The depth computation component 510 then uses the enhanced image data to perform the processing steps of an embodiment of the method of FIG. 6 to generate a depth image and to adapt the light pattern as needed for the scene. The depth image is provided to the application component 512 and the adapted pattern is provided to the projector component 508 via the imaging control component 505 to be projected into the scene.

The memory component 514 may be on-chip memory, external memory, or a combination thereof. Any suitable memory design may be used. For example, the memory component 510 may include static random access memory (SRAM), dynamic random access memory (DRAM), synchronous DRAM (SDRAM), read-only memory (ROM), flash memory, a combination thereof, or the like. Various components in the digital structured light device 500 may store information in memory in the memory component 514 as images are processed.

Further, the memory component 514 may store any software instructions that are executed by one or more processors (not shown) to perform some or all of the described functionality of the various components. Some or all of the software instructions may be initially stored in a computer-readable medium such as a compact disc (CD), a diskette, a tape, a file, memory, or any other computer readable storage device and loaded and stored on the digital structured light device 500. In some cases, the software instructions may also be sold in a computer program product, which includes the computer-readable medium and packaging materials for the computer-readable medium. In some cases, the software instructions may be distributed to the digital structured light device 500 via removable computer readable media (e.g., floppy disk, optical disk, flash memory, USB key), via a transmission path from computer readable media on another computer system (e.g., a server), etc.

The imaging control component 505 controls the overall functioning of the structured light imaging sub-system 502. For example, the imaging control component 505 may adjust the focus and/or exposure of the imaging sensor component 506 and/or the projector component 508 based on the focus quality and scene brightness, respectively, determined by the image processing component 504. The imaging control component 505 may also control the synchronization of the imaging sensor component 506 with the projector component 508 to capture images of the scene with the projected pattern. Further, the imaging control component 505 controls the pattern to be projected by the projector component 508, e.g., the imaging control component 505 receives the adaptive pattern from the depth computation component 505 and directs the projector component 508 to project the pattern.

The application component 512 receives the depth image and performs any additional processing needed for the particular application of the digital structured light device 500. The application component 512 may implement an application or applications that rely on a three-dimensional (3D) representation of a scene. For example, the application component 512 may be a 3D reconstruction application that generates point clouds (a collection of x, y, and z coordinates representing the locations of objects in 3D space) from depth maps. In other examples, the application component 512 may be an indoor robot navigation system or may be monitoring moving objects on a conveyor belt or a gaming application that adapts depth maps in real time as objects move.

FIG. 6 is a flow diagram of a method for computing depth images using an adaptive structured light pattern in a structured light imaging device, e.g., the digital structured light device 500 of FIG. 5. Initially, e.g., when the structured light imaging device is activated, an image of the scene is captured 600 with a pre-determined low frequency binary pattern projected into the scene. The low frequency binary pattern may be any suitable pattern and is used to help establish correspondences between the projected pattern image and the camera image of the three dimensional (3D) scene.

A disparity map is then generated 602 using the captured image and the low frequency pattern. Any suitable algorithm may be used to compute the disparity map. The disparity map establishes correspondences between the projected pattern and the scene. More specifically, the disparity map establishes where each pixel in the pattern is located relative to pixels in the captured image, i.e., where each pattern pixel is in the scene.

The pattern is then adapted based on scene content as determined from the captured image and/or the disparity map. More specifically, one or more regions in the pattern may be changed based on the scene content and/or the distance of objects in the scene from the camera in order to support computation of an optimal depth image for the scene. For example, the disparity map may be used to determine which regions of the scene in the captured image are closer to camera and which are further away. The pattern may be adapted to have a high frequency pattern in regions closer to the camera, a low frequency pattern in regions most distant from the camera, and a mid frequency pattern in regions between the closer and most distant regions. The determination of which disparity values correspond to regions closer, at a mid range, or most distant is implementation dependent.

In another example, analysis of the captured image may indicate that the background is stationary but there is movement in one part of the scene. The pattern may be adapted to have a fixed pattern in the region where movement is found and to have a time-multiplexed pattern in the remainder of the pattern.

In another example, analysis of the captured image and the disparity map may indicate that no light is being reflected back in one or more regions of the scene due to the color of the projected light and the colors of the objects in the one or more regions. The pattern may be adapted to project a contrasting light color in such regions in order to optimize the depth computation. For example, if an object in the scene is green and the projected light is green, no light will be reflected. The pattern may be adapted to project red light in the region of the scene where the object is located to cause the light to be reflected from the object, thus optimized depth computation for that region.

Referring again to FIG. 6, the adapted pattern is then projected 606 into the scene and an image of the scene is captured 608. A disparity map is generated 610 based on the captured image and the adapted pattern using one or more disparity map computation algorithms suitable to the adapted pattern. For example, if the adapted pattern has regions with static patterns and regions with time-multiplexed patterns, an algorithm suitable for disparity computation when a static pattern is used will be applied to the regions with static patterns and an algorithm suitable for disparity computation when multiple patterns are used will be applied to the regions where multiple patterns are used. A depth image is then generated 612 from the disparity map and output for further processing. Note that this depth image is optimized for the scene being captured. Further, the pattern adaptation is then repeated for the next image captured to adapt the pattern for any changes in the scene, e.g., movement of objects, changes in lighting, entry or exit of objects, etc.

Figure 9:
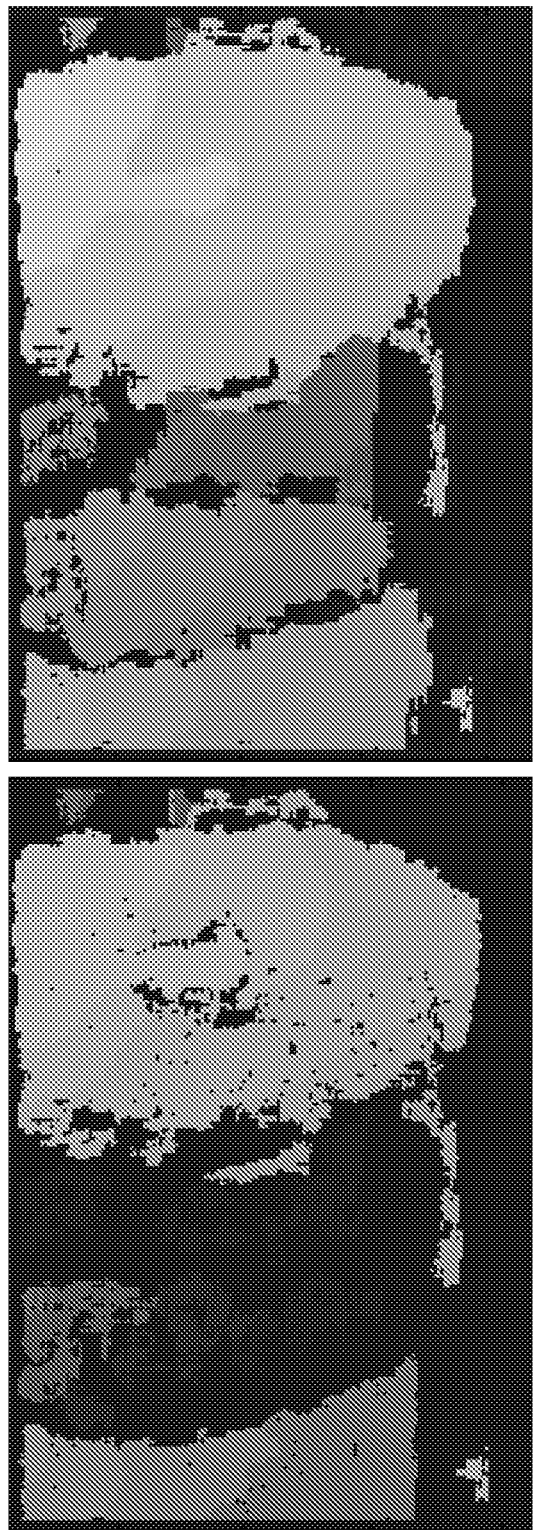

FIGS. 7, 8, and 9 are an example illustrating application of an embodiment of the method of FIG. 6. FIG. 7 shows an image of a scene captured with a low frequency binary pattern in which the objects are at different depths and have differing amounts of detail and the corresponding disparity map. This disparity map provides a rough estimate of depth and establishes correspondence between pixels in the projected pattern and the pixels in the captured image. FIG. 8 shows the adaptive pattern generated using the disparity map of FIG. 7 and an image captured using the adaptive pattern. The adaptive pattern has a high frequency pattern in the regions that are closest to the projector, a low frequency pattern in regions most distant from the projector, and a medium frequency pattern in regions at distances between the closer and more distant regions. The adaptive pattern also has a low frequency pattern in any regions where no correspondences are established. FIG. 9 shows a comparison between a depth image generated using the high frequency pattern with a depth image generated using the adaptive pattern. As can be seen in this figure, with high frequency pattern, depth is not recovered in regions that are father away due to low SNR. But with the adaptive pattern, lower frequency patterns are projected in the background, thus optimizing depth computation for the background.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein in which the adaptation of the projected pattern is performed continuously. One of ordinary skill in the art will understand embodiments in which the adaptation of the pattern is performed until there is no improvement in the disparity map, e.g., when the scene is stationary. One of ordinary skill in the art will also understand embodiments in which the adaption is performed a fixed number of times. One of ordinary skill in the art will also understand embodiments in which the adaption is performed responsive to a change being detected in the scene, e.g., movement of objects, changes in lighting, entry or exit of objects, changes in brightness or darkness, etc. One of ordinary skill in the art will also understand embodiments in which the adaption is performed responsive to a user request.

In another example, embodiments have been described herein in which the initial pre-determined pattern used to establish correspondences between the projected pattern image and the camera image is a low frequency binary pattern. One of ordinary skill in the art will understand embodiments in which other pre-determined structured light patterns are used for this purpose, e.g. a high frequency binary pattern or a time-multiplexed pattern.

Embodiments of the method described herein may be completely or partially implemented in software and the software instructions may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method of image processing in a structured light imaging device, the method comprising:
   capturing, by a camera in the structured light imaging device, a first image of a scene into which a pre-determined structured light pattern is projected by a projector in the structured light imaging device;
   generating a first disparity map based on the captured first image and the structured light pattern;
   adapting the structured light pattern based on the first disparity map to generate an adaptive pattern by replacing at least one region having a first frequency in the structured light pattern with a different light pattern having a second frequency different than the first frequency, the at least one region being less than all of the structured light pattern;
   capturing, by the camera, a second image of the scene into which the adaptive pattern is projected by the projector;
   generating a second disparity map based on the captured second image and the adaptive pattern; and
   generating a depth image using the second disparity map.

2. The method of claim 1, wherein the pre-determined structured light pattern is a low frequency binary pattern.

3. The method of claim 1, further comprising:
   adapting the adaptive pattern based on the second disparity map to modify the adaptive pattern, wherein at least one region of the adaptive pattern is replaced by a different pattern;
   capturing, by the camera, a third image of the scene into which the modified adaptive pattern is projected by the projector;
   generating a third disparity map based on the captured third image and the modified adapted pattern; and
   generating a depth map using the third disparity map.

4. The method of claim 1, wherein adapting the structured light pattern comprises adapting the structured light pattern based on the first disparity map and content of the scene in the captured first image.

5. The method of claim 4, wherein adapting the structured light pattern comprises changing a color of light used in projecting the structured light pattern to a different color in at least one region of the adaptive pattern based on content of the scene.

6. The method of claim 1, wherein the different light pattern is one selected from a high frequency pattern and a medium frequency pattern, wherein the selection is based on disparity of the at least one region.

7. The method of claim 4, wherein the different light pattern is a time-multiplexed pattern selected based on the disparity map and content of the scene, and wherein generating a second disparity map comprises applying an algorithm for computing disparity when a time-multiplexed pattern is used in the at least one region and applying a different algorithm or algorithms for computing disparity in other regions.

8. A structured light imaging device comprising:
   a projector component configured to project structured light patterns into a scene;
   an imaging sensor component configured to capture images of the scene comprising the structured light patterns; and
   a memory storing instructions that, when executed by at least one processor included in the structured light imaging device, cause the processor to:
      capture, by the camera, a first image of a scene into which a pre-determined structured light pattern is projected by the projector;
      generate a first disparity map based on the captured first image and the structured light pattern;
      adapt the structured light pattern based on the first disparity map to generate an adaptive pattern by replacing at least one region having a first frequency in the structured light pattern with a different light pattern having a second frequency different than the first frequency, the at least one region being less than all of the structured light pattern;
      capture, by the camera, a second image of the scene into which the adaptive pattern is projected by the projector;
      generate a second disparity map based on the captured second image and the adaptive pattern; and
      generate a depth image using the second disparity map.

9. The structured light imaging device of claim 8, wherein the pre-determined structured light pattern is a low frequency binary pattern.

10. The structured light imaging device of claim 8, wherein the instructions further cause the processor to:
   adapt the adaptive pattern based on the second disparity map to modify the adaptive pattern, wherein at least one region of the adaptive pattern is replaced by a different pattern;
   capture, by the camera, a third image of the scene into which the modified adaptive pattern is projected by the projector;
   generate a third disparity map based on the captured third image and the modified adapted pattern; and
   generate a depth map using the third disparity map.

11. The structured light imaging device of claim 8, wherein the instructions that cause the processor to adapt the structured light pattern include instructions that cause the processor to adapt the structured light pattern based on the first disparity map and content of the scene in the captured first image.

12. The structured light imaging device of claim 11, wherein the instructions that cause the processor to adapt the structured light pattern include instructions that cause the processor to change a color of light used in projecting the structured light pattern to a different color in at least one region of the adaptive pattern based on content of the scene.

13. The structured light imaging device of claim 8, wherein the different light pattern is one selected from a high frequency pattern and a medium frequency pattern, wherein the selection is based on disparity of the at least one region.

14. The structured light imaging device of claim 11, wherein the different light pattern is a time-multiplexed pattern selected based on the disparity map and content of the scene, and wherein the instructions that cause the processor to generate a second disparity map include instructions that cause the processor to use an algorithm for computing disparity when a time-multiplexed pattern is used in the at least one region and using a different algorithm or algorithms for computing disparity in other regions.

15. A system comprising:
   a projector configured to project a pre-determined structured light pattern into a scene;
   a camera configured to capture a first image of the scene into which the pre-determined structured light pattern is projected; and
   one or more processors configured to:
      generate a first disparity map based on the captured first image and the structured light pattern; and
      adapt the structured light pattern based on the first disparity map to generate an adaptive pattern by replacing at least one region having a first frequency of the structured light pattern with a different light pattern having a second frequency different than the first frequency, the at least one region being less than all of the structured light pattern,
   wherein the projector is further configured to project the adaptive pattern into the scene,
   wherein the camera is further configured to capture a second image of the scene into which the adaptive pattern is projected, and
   wherein the one or more processors are further configured to:
      generate a second disparity map based on the captured second image and the adaptive pattern; and
      generate a depth image using the second disparity map.

16. The system of claim 15, wherein the pre-determined structured light pattern is a low frequency binary pattern.

17. The system of claim 15,
   wherein the one or more processors are further configured to adapt the adaptive pattern based on the second disparity map to modify the adaptive pattern, wherein at least one region of the adaptive pattern is replaced by a different pattern,
   wherein the projector is further configured to project the modified adaptive pattern into the scene,
   wherein the camera is further configured to capture a third image of the scene into which the modified adaptive pattern is projected, and
   wherein the one or more processors are further configured to:
      generate a third disparity map based on the captured third image and the modified adapted pattern; and
      generate a depth map using the third disparity map.

18. The system of claim 15, wherein the one or more processors are further configured to adapt the structured light pattern based on the first disparity map and content of the scene in the captured first image.

19. The system of claim 18, wherein the one or more processors are further configured to change a color of light used in projecting the structured light pattern to a different color in at least one region of the adaptive pattern based on content of the scene.

20. The system of claim 15, wherein the different light pattern is one selected from a high frequency pattern and a medium frequency pattern, wherein the selection is based on disparity of the at least one region.

* * * * *